United States Patent
Lu et al.

(10) Patent No.: US 10,638,380 B2
(45) Date of Patent: Apr. 28, 2020

(54) METHODS AND DEVICES FOR REFERENCE SIGNAL TRANSMISSION AND MEASUREMENT

(71) Applicant: Telefonaktiebolaget LM Ericsson (publ), Stockholm (SE)

(72) Inventors: Qianxi Lu, Beijing (CN); Jianfeng Wang, Beijing (CN); Zhan Zhang, Beijing (CN); Huaisong Zhu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/579,998

(22) PCT Filed: Sep. 29, 2017

(86) PCT No.: PCT/SE2017/050950
§ 371 (c)(1),
(2) Date: Dec. 6, 2017

(87) PCT Pub. No.: WO2018/063074
PCT Pub. Date: Apr. 5, 2018

(65) Prior Publication Data
US 2019/0223065 A1 Jul. 18, 2019

(30) Foreign Application Priority Data
Sep. 30, 2016 (WO) ................ PCT/CN2016/101291

(51) Int. Cl.
*H04W 36/00* (2009.01)
*H04L 5/00* (2006.01)
(Continued)

(52) U.S. Cl.
CPC ....... *H04W 36/0058* (2018.08); *H04L 5/0048* (2013.01); *H04W 36/0072* (2013.01);
(Continued)

(58) Field of Classification Search
CPC ......... H04W 36/0058; H04W 36/0088; H04W 36/0072; H04W 72/0413; H04W 72/0446; H04W 24/10; H04L 5/0048
See application file for complete search history.

(56) References Cited

U.S. PATENT DOCUMENTS

| | | | |
|---|---|---|---|
| 2013/0170362 A1* | 7/2013 | Futaki ................ | H04W 24/10 370/241.1 |
| 2013/0217404 A1* | 8/2013 | Jung ..................... | H04W 72/08 455/452.1 |

(Continued)

FOREIGN PATENT DOCUMENTS

| | | |
|---|---|---|
| CN | 103765969 A | 4/2014 |
| RU | 2520358 C1 | 6/2014 |

(Continued)

OTHER PUBLICATIONS

Unknown, Author, "Discussion on CSI Reporting Enhancements for Hybrid CSI-RS", 3GPP TSG RAN WG1 Meeting #86, R1-166844, LG Electronics, Gothenburg, Sweden., Aug. 22-26, 2016, pp. 1-7.

*Primary Examiner* — Ajay Cattungal
(74) *Attorney, Agent, or Firm* — Murphy, Bilak & Homiller, PLLC

(57) ABSTRACT

Embodiments of the present disclosure relate to methods and devices for reference signal transmission and measurement. In example embodiments, according to a method implemented in a network device is provided, a report related to a measurement of a first reference signal is received from a terminal device. The first reference signal has been sent from the network device to the terminal device according to a first periodicity. Then an indication of a second periodicity for receiving a second reference signal is sent to the terminal device based on the report. The second reference signal is associated with the first reference signal.

35 Claims, 5 Drawing Sheets

(51) Int. Cl.
*H04W 72/04* (2009.01)
*H04W 24/10* (2009.01)

(52) U.S. Cl.
CPC ... *H04W 36/0088* (2013.01); *H04W 72/0413* (2013.01); *H04W 72/0446* (2013.01); *H04W 24/10* (2013.01)

(56) References Cited

U.S. PATENT DOCUMENTS

| | | |
|---|---|---|
| 2013/0242778 A1 | 9/2013 | Geirhofer et al. |
| 2014/0198763 A1* | 7/2014 | Sorrentino ............. H04B 7/024 370/330 |
| 2014/0329553 A1* | 11/2014 | Nakashima ......... H04W 52/365 455/522 |
| 2014/0354159 A1* | 12/2014 | Zhang ................ H05B 33/0815 315/127 |
| 2015/0180628 A1 | 6/2015 | Kim et al. |
| 2016/0335988 A1* | 11/2016 | Shin ..................... G09G 3/2022 |
| 2016/0338056 A1* | 11/2016 | Xue ........................ H04W 4/06 |
| 2017/0126376 A1* | 5/2017 | Wang .................... H04W 88/02 |
| 2017/0230967 A1* | 8/2017 | Jitsukawa ......... H04W 72/0413 |
| 2018/0302206 A1* | 10/2018 | Kang ................. H04W 74/006 |

FOREIGN PATENT DOCUMENTS

| | | |
|---|---|---|
| TW | 201404194 A | 1/2014 |
| WO | 2011100672 A1 | 8/2011 |
| WO | 2015124029 A1 | 8/2015 |
| WO | 2016053426 A1 | 4/2016 |

* cited by examiner

METHODS AND DEVICES FOR REFERENCE SIGNAL TRANSMISSION AND MEASUREMENT

TECHNICAL FIELD

Embodiments of the present disclosure generally relate to the field of telecommunication, and in particular, to methods and devices for reference signal transmission and measurement.

BACKGROUND

In telecommunication networks such as those based on the 3rd Generation Partnership Project (3GPP) specifications, to evaluate a quality of a communication channel, a reference signal is transmitted from a network device (which is also called as a base station) to a terminal device (which is also called as a user device or user equipment) according to a certain periodicity. The terminal device measures the quality of the channel based on the received reference signal and sends a measurement report to the network device. The report may also be generated and transmitted according to a periodicity configured by the network device. The periodicity for sending a reference signal by a network device may be referred to as a periodicity of reference signal transmission or simply a transmission periodicity. The periodicity for measuring the reference signal by the terminal device may be referred to a periodicity of reference signal measurement or simply a measurement periodicity.

Generally, in current 3GPP networks such as Long Term Evolution (LTE) networks, a small period for transmitting the reference signal is configured (such as 1 ms) so that the terminal devices in the networks are able to receive that signal almost at any time they want. To reach an accuracy level, a terminal device may generate the report by considering the reference signal sent and received at different periodicity. Therefore, the period for the report may be larger than the period for transmitting the reference signal. For example, when the reference signal is sent according to a period of 1 ms, the terminal device may receive one sample of the reference signal at every 40 ms and use the 5 samples to generate a report. The measurement period of the report is thus 40*5=200 ms.

With massive growth of the numbers of devices and traffic volume, the fifth generation (5G) wireless communication systems are being developed to build ultra-reliable connection for high frequencies and enable a networked society, where information can be accessed and data can be shared anywhere and anytime, by anyone with anything. In current standardization work of the 3GPP, New Radio (NR) techniques have been proposed. Some aims of the NR techniques are to increase (boost) the data rate, to save energy, and to decrease un-necessary interference as much as possible for both the network device and terminal device.

A requirement is therefore raised to increase the transmission periodicity of the reference signal (for example, to a level of 100 ms) so that resources and energies of the network device can be reserved for other processing (transmissions, receptions, and/or calculations). However, the increased transmission periodicity may cause some potential problems. On one hand, the measurement periodicity may be likewise increased and thus result in a long measurement period for the terminal device. For example, if 5 samples of the reference signal are needed to generate a report, the terminal device may have to wait for at least 500 ms. On the other hand, there is a tightened requirement on reliability or latency for many use cases of the terminal device where the increased measurement periodicity may be in-flexible or even un-acceptable.

SUMMARY

In general, example embodiments of the present disclosure provide methods and devices for reference signal transmission and measurement.

In a first aspect, a method implemented in a network device is provided. According to the method, the network device receives a report related to a measurement of a first reference signal from a terminal device. The first reference signal has been sent from the network device to the terminal device according to a first periodicity. Then the network device send an indication of a second periodicity for receiving a second reference signal to the terminal device based on the report. The second reference signal is associated with the first reference signal.

In some embodiments, in response to sending the indication of the second periodicity, the network device may send the first reference signal to the terminal device according to the first periodicity and sends the second reference signal to the terminal device according to the second periodicity.

In some embodiments, the network device may send the first reference signal using a first beam with a first width and send the second reference signal using one or more second beams with a second width.

In some embodiments, the second width may be less than the first width.

In some embodiments, the network device may determine, based on a location of the terminal device, one or more of the second width and the number of the second beams.

In some embodiments, the network device may determine, based on the report, whether the terminal device is to handover from the network device to a further network device; and in response to determining that the terminal device is to handover, send the indication of the second periodicity.

In some embodiments, the report may be further related to a measurement of a third reference signal sent to the terminal device by a further network device according to the first periodicity. The network device may send to the further network device an indication of the second periodicity for sending a fourth reference signal, wherein the fourth reference signal is associated with the third reference signal.

In some embodiments, the network device may determine, based on the report, whether the terminal device is to handover from the network device to the further network device, and in response to determining the terminal device is to handover, send the indication of the second periodicity to the further network device.

In some embodiments, in response to determining that the terminal device is to handover, the network device may send an identifier of the further network device to the terminal device for receiving the fourth reference signal.

In some embodiments, the network device may send a location of the terminal device to the further network device to trigger the further network device to determine one or more of the following: a third width for one or more third beams for sending the fourth reference signal, and the number of the third beams.

In some embodiments, the network device may send the indication of the second periodicity to a further terminal device.

In some embodiments, the network device may send the indication of the second periodicity based a Radio Network Temporary Identity (RNTI). The RNTI may be defined for a group of terminal devices including the terminal device and the further terminal device.

In some embodiments, the network device may send to the terminal device configuration information for the report.

In some embodiments, the network device may determine a traffic type of the terminal device and send the configuration information for the report based on the traffic type.

In some embodiments, the configuration information may include one or more of the following: a first threshold for determining whether a first channel quality between the terminal device and the network device is lower than a second channel quality between the terminal device and a further network device; and a second threshold for determining whether the second channel quality is low.

In a second aspect, a method implemented in a terminal device is provided. According to the method, terminal device determines a report based on a measurement of a first reference signal. The first reference signal has been received by the terminal device from a network device according to a first periodicity. The terminal device sends the report to the network device to trigger the network device to send a second reference signal. The second reference signal is associated with the first reference signal. The terminal device receives from the network device an indication of the second periodicity for receiving the second reference signal.

In some embodiments, in response to receiving the indication of the second periodicity, the terminal device may receive from the network device the first reference signal to the terminal device according to the first periodicity and receive from the network device the second reference signal to the terminal device according to the second periodicity.

In some embodiments, the terminal device may receive the first reference signal sent by using a first beam with a first width, and receive the second reference signal sent by using one or more second beams with a second width.

In some embodiments, the second width may be less than the first width.

In some embodiments, the terminal device may determine whether a signal strength of the second reference signal is higher than a predetermined threshold, and in response to determining that the signal strength of the second reference signal is higher than the threshold, determine a further report based on a measurement of the second reference signal.

In some embodiments, the terminal device may determine an average measurement based on a measurement of the first reference signal and a further measurement of a further reference signal received using the first beam and determine the further report further based on the determined average measurement.

In some embodiments, the terminal device may determine the report further based on a measurement of a third reference signal received from a further network device according to the first periodicity. The report indicates whether the terminal device is to handover from the network device to the further network device.

In some embodiments, in response to the report indicating that the terminal device is to handover, the terminal device may receive an identifier of the further network device from the network device and receive, based on the received identifier, a fourth reference signal from the further network device according to the second periodicity. The fourth reference signal is associated with the third reference signal.

In some embodiments, the terminal device may receive the indication of the second periodicity based on a RNTI, wherein the RNTI is defined for a group of terminal devices including the terminal device and a further terminal device.

In a third aspect, a network device is provided. The network device includes a receiving unit configured to receive from a terminal device a report related to a measurement of a first reference signal, wherein the first reference signal has been sent from the network device to the terminal device according to a first periodicity. The network device also includes a sending unit configured to send, based on the report, to the terminal device an indication of a second periodicity for receiving a second reference signal, wherein the second reference signal is associated with the first reference signal.

In a fourth aspect, a terminal device is provided. The terminal device includes a determining unit configured to determine a report based on a measurement of a first reference signal, wherein the first reference signal has been received by the terminal device from a network device according to a first periodicity. The terminal device also includes a sending unit configured to send the report to the network device to trigger the network device to send a second reference signal, wherein the second reference signal is associated with the first reference signal. The terminal device further includes a receiving unit configured to receive from the network device an indication of the second periodicity for receiving the second reference signal.

In a fifth aspect, there is provided an apparatus at a network device. The apparatus comprises a processor and a memory. The memory contains instructions executable by the processor, whereby the apparatus is operative to perform the method according to the first aspect.

In a sixth aspect, there is provided an apparatus at a terminal device. The apparatus comprises a processor and a memory. The memory contains instructions executable by the processor whereby the apparatus is operative to perform the method according to the second aspect.

In a seventh aspect, there is provided a computer program product that is tangibly stored on a computer readable storage medium. The computer program product includes instructions which, when executed on at least one processor, cause the at least one processor to carry out the method according to the first or second aspect.

Through the following description, it would be appreciated that according to embodiments of the present disclosure, the periodicity of signal reference transmission can be adaptively changed by a network device. The change of the periodicity is triggered by a report from a terminal device. Therefore, it is possible to decrease the periodicities for reference signal transmission and measurement for a specific terminal device when it needs to perform fast measurements While keep the periodicities at a high level in other cases. It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
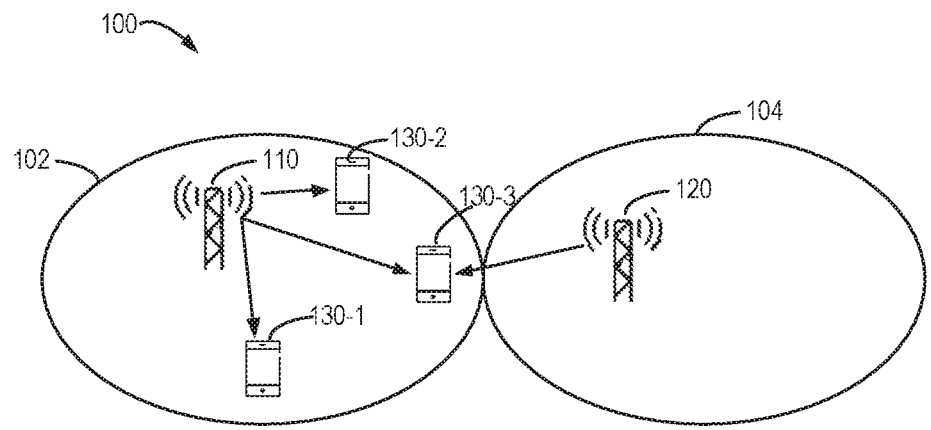
FIG. 1 is a block diagram of a communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" or "user equipment" (UE) refers to any device having wireless or wired communication capabilities. Examples of the terminal device include, but not limited to, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

In current telecommunication networks, a transmission periodicity for a reference signal is configured to a statistic level. For example, a cell-specific reference signal (CRS) is transmitted by a network device every 1 ms. There have been specified in the current specifications different requirements on the measurement periodicity of the reference signal for different purposes. For example, to enable handover, the measurement periodicity is required at 200 ms for cases without discontinuous reception (DRX) cycles, which limits the latency for the physical layer of a terminal device to report related measurements to higher layers. In other cases with DRX cycles, the measurement periodicity increases in proportion to the DRX cycle length for DRX cycles larger than 40 ms in intra-frequency cases.

As an example, when DRX is used in the RRC_CONNECTED state, the measurement period (denoted as $T_{measure\_intra}$) for intra-frequency measurements in frequency division duplex (FDD) is as shown in Table 1 below.

TABLE 1

| DRX cycle length (s) | $T_{measure\_intra}$ (s) (DRX cycles) |
|---|---|
| ≤0.04 | 0.2 (Note 1) |
| 0.04 < DRX-cycle ≤ 2.56 | Note 2 (5) |

(Note 1):
Number of DRX cycle depends upon the DRX cycle in use;
Note 2:
Time depends upon the DRX cycle in use According to Table 1, the measurement period is fixed to 200 ms for DRX cycles with lengths smaller than 40 ms and is 5 times longer than the DRX cycle length when the DRX cycle length is larger than 40 ms. The reason that the measurement period increases from a DRX cycle length of 40 ms is that in practice, a gap of 40 ms is used as the minimum value for measuring the reference signal at the terminal device, and thus 5 samples of the reference signal can still be obtained in the small measurement period of 200 ms to reach the accuracy level. Otherwise, reducing of the measurement interval will not help because the fading may not change very fast and it better to distribute the samples over the measurement period to get a more reliable measurement. When the measurement period is larger than 200 ms, the measurement interval may be defined as the DRX cycle length in use.

In cases of inter-frequency measurements for handover, it is also required in current specification that when measurement gaps are scheduled for inter-frequency measurements or the terminal device supports capability of conducting such measurements without gaps, the physical layer of the terminal device shall be capable of reporting measurements to higher layers with certain measurement accuracy. In these cases, the measurement period (denoted as $T_{Measurement\_Period\_Inter\_FDD}$) is specified as in Table 2 below.

TABLE 2

| Configuration | Physical Layer Measurement period: $T_{Measurement\_Period\_Inter\_FDD}$ [ms] (normal performance) | Physical Layer Measurement period: $T_{Measurement\_Period\_Inter\_FDD}$ [ms] (reduced performance) | Measurement bandwidth [RB] |
|---|---|---|---|
| 0 | 480 × $K_n$ × $N_{freq,n}$ | 480 × $K_r$ × $N_{freq,r}$ | 6 |
| 1 (Note) | 240 × $K_n$ × $N_{freq,n}$ | 240 × $K_r$ × $N_{freq,r}$ | 50 |

(Note):
This configuration is optional

The terminal device is capable of performing reference signal measurements of at least 4 inter-frequency cells per FDD inter-frequency for up to 3 FDD inter-frequencies or 8 FDD inter-frequencies if the terminal device supports Increased UE carrier monitoring Evolved Universal Terrestrial Radio Access (E-UTRA) and the physical layer of the terminal device is capable of reporting RSRP, RSRQ, and RS-SINR measurements to higher layers with the measurement period defined in Table 2.

When DRX is used in the cases of inter-frequency measurements, the measurement period (here denoted as $T_{measure\_inter}$) is specified as in Table 3 below.

TABLE 3

| DRX cycle length (s) | $T_{measure\_inter}$ (s) (DRX cycles) (normal performance) | $T_{measure\_inter}$ (s) (DRX cycles) (reduced performance) |
|---|---|---|
| ≤0.08 | Non DRX Requirements in LTE specification 36.133, 8.1.2.3.1.1 are applicable | Non DRX Requirements in LTE specification 36.133, 8.1.2.3.1.1 are applicable |
| 0.08 < DRX-cycle ≤ 2.56 | Note (5 * $K_n$ * $N_{freq,n}$) | Note (5 * $K_r$ * $N_{freq,r}$) |

Note:
Time depends upon the DRX cycle in use

Based on Table 3, the time to measure inter frequency cells are 480 ms, which furthermore increases linearly with the number of carrier frequencies that has to be measured. In addition, the measurement period also increases in proportion to the DRX cycle for DRX cycles larger than 80 ms for inter-frequency cases.

It is expected that the channel variations in NR can be both faster and more severe than for example in current networks such as LIE due to the lower dispersion at high frequencies. Sudden deterioration of the serving beam SINR may occur due to shadowing, for example, in "around the corner" situations. The serving beam SINR may drop by over 20 dB within 5-10 ms. Such occasional drops will be unavoidable at 10-30 GHz and they are required to be handled by mobility algorithms.

This means measurements for handover may be even more important for NR than in for example LTE. Typically, handover measurements are averaged in time and relatively slow in order to avoid ping-pong effects. In LTE the intra-frequency handover measurements period is 200 ms and inter frequency measurements period is 480 ms. These handover measurements may be too slow to be able to react to the sudden channel changes in NR. Also, the requirement for NR is to have an ultra-reliable connection and aim for a very low data interruption when a handover is performed.

One way to overcome this is to use multi-connectivity (MC) solutions such as NR multi-connectivity and LTE-NR tight integration.

Though various requirements are defined in current communication specifications for different intra-frequency and inter-frequency measurements, the terminal device is always capable of measuring several samples of a reference signal and determining a corresponding report with a certain accuracy level due to the small transmission period of the reference signal. In order to achieve an ultra-reliable connection for high frequencies in NR, there is a desire to make the measurement of the reference signal (for example, both the intra-frequency and inter-frequency measurements) fast or even faster than in current specifications.

However, as mentioned above, in the developing NR techniques, it is proposed to increase a transmission periodicity of the reference signal in order to meet the required data rate, energy efficiency, and interference level. However, the increased transmission periodicity may cause some potential problems. One of the problems is the corresponding increase of the measurement periodicity. Apparently, this collides with the desire of fast reference signal measurement. In addition, the increased transmission periodicity as well as the increased measurement periodicity may result in a compromise on reliability and latency requirements in many use cases, especially for real-time cases such as ultra-reliable and low latency communications (URLLC) communications or evolved-Vehicle-to-Everything (eV2x) communications. For example, in the scenario of high mobility cases, a high gap between two measurement reports may increase the handover failure rate or handover latency, which is undesirable for traffics with real time requirements.

In order to at least in part solve the above and other potential problems, embodiments of the present disclosure provide a new solution for reference signal transmission and measurement. Instead of configuring a fixed and statistic periodicity for transmitting a reference signal (also referred to as a transmission periodicity), the transmission periodicity can be adaptively changed by a network device for a terminal device(s).

Specifically, in a first configuration, a first reference signal is sent according to a periodicity that is at a relatively high level. To increase the frequency of the reference signal transmission, in a second configuration, an additional second reference signal is sent according to another periodicity. Both the first and second reference signals can be received and measured by the terminal device to generate a report. In this way, the periodicity for the reference signal measurement is decreased, so is the periodicity of the reference signal transmission. The change of the periodicity may be triggered by a report from the terminal device, which report is determined by the terminal device based on the first reference signal that has been received. Therefore, it is possible to decrease the periodicities for reference signal transmission and measurement for a terminal device when it needs to perform fast measurements while keep the periodicities at a high level in other cases.

FIG. 1 shows an example communication network 100 in which embodiments of the present disclosure can be implemented. The network 100 includes a network device 110 and three terminal devices 130-1, 130-2 and 130-3 (collectively, terminal device(s) 130) served by the network device 110. The coverage of the network device 110 is also called as a cell 102. The network 110 also includes a cell 104 adjacent to the cell 102, coverage of which is provided by a network device 120. It is to be understood that the number of base stations and terminal devices is only for the purpose of illustration without suggesting any limitations. The network 100 may include any suitable number of base stations and the terminal devices adapted for implementing embodiments of the present disclosure. Although not shown, it would be appreciated that one or more terminal devices may be located in the cell 104 and served by the network device 120.

The network device 110 may communicate with the three terminal devices 130. The network device 110 may send a reference signal in a broadcast, multi-cast, and/or unicast manners to one or more of the three terminal devices 130. The reference signal is a signal that is known by both the network device and the terminal devices 130. By receiving and measuring the reference signal, each terminal device 130 may determine a report related to the measurement of the reference signal and send it back to the network device 110. Based on the report, the network device 110 may be aware of the quality of a communication channel with that terminal device 130.

Due to the proximity of the cell 104, some of the terminal devices 130 may be interfered by communications of the network device 120. For example, the network device 120 may also transmit a reference signal to terminal devices located in its cell 104. The terminal device 130-3, which is located in a cell-edge area of the cell 102, may also receive the reference signal sent by the network device 120. In some configurations, the measurement of the reference signal from the network 120 may be measured by the terminal device 130-3.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As described above, according to embodiments of the present disclosure, the network device 110 determine whether or not to change the periodicity of reference signal transmission and measurement based on a report from a terminal device 130. The principle and implementations of the present disclosure will be described in detail below with reference to FIG. 2, which shows a process 200 of reference signal transmission and measurement. For the purpose of discussion, the method 200 will be described with reference to FIG. 1.

Figure 2:
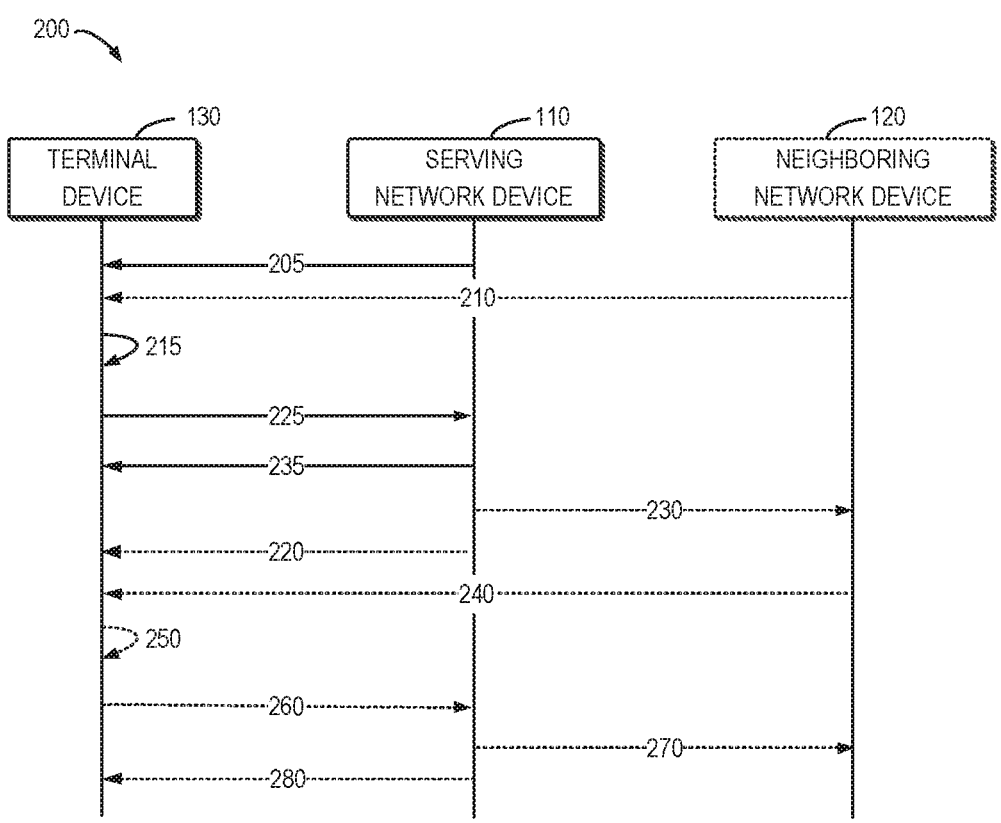
FIG. 2 is a flowchart illustrating a process of reference signal transmission and measurement according to some embodiments of the present disclosure.

As shown, the process 200 may involve the terminal device 130, the network device 110 serving the terminal device 130 ("serving network device" in FIG. 2), and the network device 120 neighboring to the network device 110 ("neighboring network device" in FIG. 2). It would be appreciated that in some embodiments, the network device 120 and operations related to it may be omitted.

The network device 110 sends (205) a reference signal (referred to as a first reference signal) to the terminal device 130 according to a first periodicity. In some embodiments, for the purposes of increasing (boosting) the data rate, saving energies of the network device 110 and the terminal device 130, and/or decreasing un-necessary interference, the first periodicity may be configured at a relatively long level. For example, the first periodicity may be configured so that the first reference signal is transmitted in a period of 50 ms, 100 ms, 200 ms, or any other values. The terminal device 130 may be notified with the first periodicity before the first reference signal is sent so that it may determine at which time points the first reference signal is expected and thus can receive this reference signal accordingly. In some cases, the first periodicity may be configured to the terminal device 130 upon or after a connection with the network device 110 being set up.

In some embodiments, the first reference signal may be any downlink reference signal such as a cell-specific reference signal (CRS), a UE-specific reference signal, a channel state indication-reference signal (CSI-RS), or the like. The network device 110 may transmit the first reference signal to estimate a channel quality between the network device 110 and the terminal device 130. In some embodiments, the first reference signal may be transmitted in a broadcast or multi-cast manner so that in addition to the terminal device 130, other terminal devices served by the network device 110 may also receive this signal. In some other embodiments, the first reference signal may be dedicated to the terminal device 130 and thus may be sent in a unicast manner. According to the first periodicity, the first reference signal may be transmitted at different time points repeatedly. As used herein, the first reference signal sent (or received) at a time point may be referred to as a sample (copy or instance) of this reference signal.

The terminal device 130 receives the first reference signal from the network device 110 and determines (215) a report based on a measurement of the received first reference signal. The terminal device 130 may measure the first reference signal in various aspects. In some embodiments, the terminal device 130 may determine a L3 measurement. For example, a reference signal received power (RSRP), a reference signal received quality (RSRQ), and/or a reference signal—signal to interference plus noise ratio of the first reference signal (RS-SINR) may be measured with respect to the first reference signal.

The report may be generated based on a configuration from the network device 110, for example. In some embodiments, one or more A-events (for example, any of A1 to A6 events) that have been defined in the specifications may be defined and configured at the terminal device 130. The terminal device 130 may determine whether to send the report or not based on the measurement result. In some embodiments, some specific configurations of the report may be defined and configured to the terminal device 130, which will be described below.

In some embodiments, the neighboring network device 120 also transmits (210) a reference signal (referred to as a third reference signal). The third reference signal may be sent according to the same first periodicity of the first reference signal. That is, the periodicity configuration for transmitting a reference signal at the network device 120 is the same as that at the network device 110. In some examples, a type of the third reference signal may be the same as the first reference signal. For example, both the first and second reference signals are CRS.

Due to proximity between the terminal device 130 and the network device 120 (for example, the terminal device 130 is located in a cell-edge area of the network device 110), the terminal device 130 receives the third reference signal. In some cases that the determination of the report requires to compare a first channel quality between the terminal device 130 and the network device 110 and a second channel quality between the terminal device 130 and the network device 120, the terminal device 130 may measure the received third reference signal and determine the report further based on the measurement of the third reference signal. Such cases may include examples where a series of A-events are configured at the terminal device 130.

As an example, if the terminal device 130 is configured to report an A3 event, which is used to trigger a handover of the terminal device 130 from the current serving network device 110 to a different network device, the terminal device 130 may then determine whether the second channel quality of the network device 120 is higher than the first channel quality of the serving network device 110 plus an offset value. In this case, the measurements of the first and third reference signals both are used to make the decision. In response to the second channel quality being higher, a report of an A3 event is generated and sent to the network device 110.

The terminal device 130 sends (225) to the network device 110 the determined report, which relates to at least the measurement of the first reference signal. In some embodiments, the report may be transmitted either periodically or based on a predetermined event, and may be delivered via a physical (PHY) channel (for example, using a control element of media access control (MAC CE) or a radio resource control (RRC) signaling).

In embodiments of the present disclosure, in response to reception of the report, the network device 110 decides whether to send a second reference signal to the terminal device so as to increase the reference signal densification (or decrease the periodicity of the reference signal transmission). That is, although the transmission of the report is a normal operation for the terminal device 130 in cases of receiving a reference signal, the report may be acted as a trigger for the network device 110 to enable or disable the change of the periodicity for the reference signal transmission. Therefore, the network device 110 sends (235), based on the report, to the terminal device 130 an indication of a second periodicity for receiving an additional reference signal (referred to as a second reference signal). In this case, the network device 110 determines based on the report that the periodicity of the reference signal transmission is to be reduced and thus the additional second reference signal is to be sent, and then sends the indication of the second periodicity is sent. A purpose of sending the second reference signal is to decrease the periodicity of reference signal transmission and thus decrease the periodicity of reference signal measurement.

The second reference signal is associated with the first reference signal. The term "associated" used here means that the second reference signal plays the same role as the first reference signal in terms of reference signal measurement. For example, the second reference may be the same type of the first reference signal such as CRS and may also be used to generate a report in a similar way as the first reference signal. For example, both the first and second reference signal may be related to a report of an A-event (any of A1 to A6). In some examples, the second reference signal may be the same as the first reference signal. Of course, they may be different from each other (but both known by the terminal device 130 and the network device 110). Two different terms (the first reference signal and the second reference signal) are used here because compared with transmission of the first reference signal in a normal mode, the second reference signal is transmitted to increase the reference signal densification.

In some embodiments, it is desirable if the reference signal densification is increased (and the reference signal transmission is decreased) as needed by the terminal device 130. For example, in some cases where the terminal device 130 is to handover to a further network device, which may happen when the terminal device 130 is in a cell-edge area, the decreased reference signal transmission is desirable so that a fast handover may be obtained based on a corresponding fast reference signal measurement. In some embodiments, the network device 110 may determine whether the terminal device 130 is to handover from the network device 110 to a further network device (for example, the neighboring network device 120). If the terminal device 130 is determined to handover, the indication of the second periodicity is sent to the terminal device 130.

The network device 110 may determine whether the terminal device 130 is to handover based on the received report. For example, if the report indicates that the channel quality of the network device 120 is better than the current serving network device 110 (for example, a report related to an A3 event), the network device 110 may determine that the terminal device 130 may be moving to the cell edge and is to handover to the network device 120.

In some embodiments, to enable the reference signal densification before the actual handover is occurred, some special configurations related to the report may be defined. In one embodiment, a threshold for determining a report is configured for the terminal device 130. For example, the network device 110 may set a threshold (the offset value) for reporting the A3 event. To trigger the report of the A3 event earlier, the offset value may be set to a relaxed value. If the offset value is set as 4 dB, which means that a report of A3 event is sent by the terminal device 130 when the channel quality of the network device 120 is higher than the channel quality of the serving network 110 plus 4 dB, a new offset value of 0 dB is defined so that as soon as the terminal device 130 finds that the channel quality of the network device 120 is possible to be increased, a report of A3 event is sent. In this way, the definition of the A3 event in current specification can be re-used. Thus, the reference signal densification may be increased based on this report. It would be appreciated that other configurations of the report may be configured so as to trigger the reference signal densification.

The indication of the second periodicity is sent to the terminal device 130 so that the device can determine at which time points the second reference signal is expected. The second periodicity for sending the second reference signal may be the same as or different from the first periodicity for sending the first reference signal (for example, at a lower or higher level). Due to the additional transmission of the second reference signal, it is possible for the terminal device 130 to determine and transmit a further report in a faster way compared with the report determined based on a measurement of the first reference signal only.

The indication of the second periodicity may be used to notify a terminal device to be prepared to receive reference signals at a fast speed. Since the network device 110 will scarify time and bandwidth resources to transmit the reference signal, it would be better if more other terminal devices can also be benefit from it even the reference signal densification may not be expected by those terminal devices as much as the terminal device 130. In some embodiments, the network device 110 may send the indication of the second periodicity to one or more further terminal devices which may be located in its serving cell 102 and/or other cells). In some embodiments, the further terminal device(s) may be in the same group of terminal devices as the terminal device 130 (the group of terminal devices may be divided based on certain criteria) In these embodiments, the indication of the second periodicity may be sent to the further terminal device(s) and the terminal device 130 based on a Radio Network Temporary Identity (RNTI) which is defined for the group including the terminal device 130. For example, a RNTI-based network signaling with that indication may be broadcast or multi-cast.

In response to sending the indication of the second periodicity, the network device 110 may send (220) the second reference signal to the terminal device 130 according to the second periodicity. As mentioned, the purpose of sending the second reference signal is to decrease the periodicity of reference signal transmission and thus decrease the periodicity of reference signal measurement. In some embodiments, this purpose is achieved by sending the first reference signal according to the first periodicity and additional sending the second reference signal according to the second periodicity. The time points for sending the first and second reference signals may be determined as different. In this case, the first reference signal may also be sent to the terminal device 130.

By way of example, the first periodicity is configured as a level of 100 ms and thus the first reference signal may be sent at time points of 0 ms, 100 ms, 200 ms, and the like. It is supposed that the second periodicity is also configured as a level of 100 ms and thus the second reference signal may be sent at time points of 50 ms, 150 ms, 250 ms, and the like. Therefore, the periodicity of the reference signal transmission is at a level of 50 ms, which is decreased compared with the original first periodicity. In these cases, the first reference signal may be still sent as normally while the second reference signal is added into the transmission.

In some other embodiments, the second reference signal may be transmitted in any other manners according to the second periodicity, as long as the sending of this reference signal decreases the periodicity of the reference signal transmission. In one example, the second periodicity may be configured as less than the first periodicity and only the second reference signal is transmitted after sending the indication. In another example, the second reference signal is sent at time points according to the second periodicity while the first reference signal is sent according to another periodicity.

In some embodiments, one or more of the first and second reference signals are sent using beams. The first reference signal is transmitted using a first beam with a first width. In cases where the first reference signal is sent to not only a terminal device 130 but also other terminal devices, the first beam may be a wide (broad) beam so that multiple terminal devices in the coverage of the network device 110 may receive this signal. The second reference signal is transmitted using a second beam with a second width. In some embodiments, it is desired to transmit the second reference signal to terminal devices that need reference signal densification only and thus the second beam may be a narrow beam. That is, the second width of the second beam may be less than the first width of the first wide beam.

By sending the first reference signal with a wide beam and sending the second reference signal with a narrow beam, most of the terminal devices can receive the first reference signal with a relatively long periodicity while only the terminal device(s) which needs the densification (for example, the terminal device 130) may receive the second reference signal. In some embodiments, more than one second beam may be used to transmit the second reference signal. For example, if a plurality of terminal devices located in different locations need the reference signal densification and thus a plurality of second beams may be used to cover those devices. Multiple second beams may also be helpful when the accurate location of the terminal device 130 is not known by the network device 110. The number of the second beams may be determined based on a location of the terminal device 130 (which may be estimated based on available information such as the report). The width of the second beams may also be dependent on the location of the terminal device 130.

It would be appreciated that if the second beams are used for sending the signal to some other terminal devices, its number and width may also be associated with the locations of those devices (and/or their number). It would also be appreciated that the network device 110 may determine the number of the second beams and their width based on other criteria. Although the first beam has been described as a wide beam (or broader than the second beam(s), in some other embodiments, the first beam may also include a narrow beam(s) for example when the first reference signal is aimed to be sent to a group of terminal devices or a specific terminal device.

Figure 3:
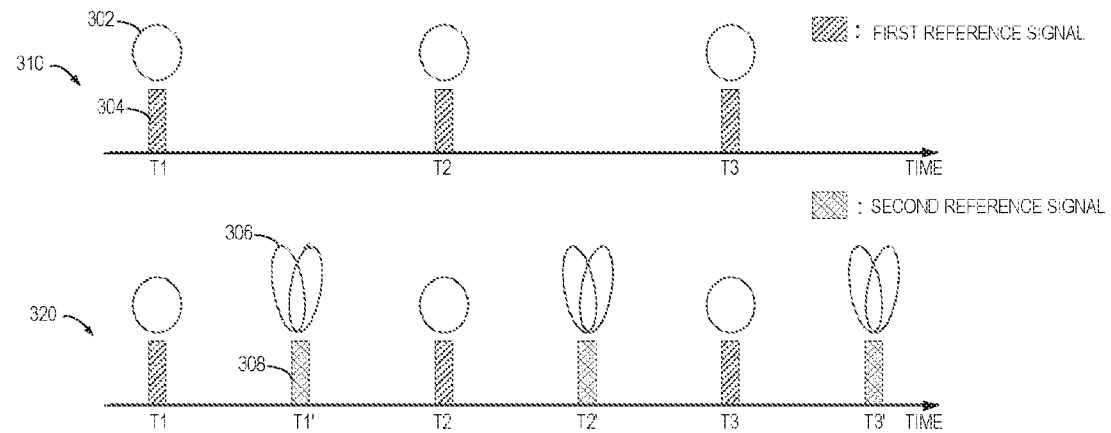
FIG. 3 illustrates transmissions of a reference signal using beams according to some embodiments of the present disclosure.

FIG. 3 illustrates the transmissions of reference signals using beams according to some embodiments of the present disclosure. As shown by the upper part indicated by 310, a first reference signal 304 is transmitted according to the first periodicity for example at 205 of FIG. 2 using a wide beam 302. Different samples of the first reference signal 304 are sent at time points T1, T2, and T3. As shown by the lower part indicated by 320, the first reference signal 304 is still transmitted according to the first periodicity using the wide beam 302 while a second reference signal 308 is additional transmitted according to a second periodicity using narrow beams 306. Several samples of the first reference signal 304 are transmitted at time points T1, T2, and T3 while several samples of the second reference signal 308 are transmitted at time points T1', T2', and T3'. That is, in the reference signal densification, the transmissions of the first reference signal remain the same and extra transmissions of the second reference signal are added.

It would be appreciated that although the first reference signal 304 is shown as transmitted at T1, T2, and T3 in both the parts 310 and 320, the exact time points may be different in both the parts 310 and 320. For example, the reference signal transmission shown in the part 320 may be performed by the network device 110 at 220 of FIG. 2. Based on the transmissions of the first and second reference signals, the terminal device 130 may receive them accordingly and perform reference signal measurement, which will be discussed below In some embodiments, the reference signal densification at the network device 110 may also be notified to some neighboring network devices such as the network device 120. Returning to FIG. 2, the network device 110 may transmit (230) the same indication of the second periodicity to the network device 120. Based on the indication of the send periodicity, the network device 120 may transmit a reference signal (referred to as a fourth reference signal) to the terminal device 130, which may be associated with the third reference signal. The relationship between the third and fourth reference signals may be similar as that between the first and second reference signal. The indication may be used to trigger the network device 120 to provide reference signal densification for the terminal device 130, for example, to decrease the periodicity of the reference signal transmission from the original first periodicity of the third reference signal to a higher level. This indication may be sent via an inter-node interface, such as an X2 interface.

In some embodiments, the network device 110 may determine to inform only the network device(s) that is related to the reference signal measurement at the terminal device 130 or to the activity to be performed by the device 130 with the indication of the second periodicity. In one example, the network device 110 may determine, based on the received report, whether the terminal device 130 is to handover from the network device 110 to the network device 120. The network device 110 may send the indication of the second periodicity to the network device 120 when it determines that the terminal device 130 is to handover. The determination of the handover event has been described above and thus is omitted here for brevity.

It would be appreciated that the network device 110 may determine other relevant events that can trigger the network device 120 to increase the reference signal densification for the terminal device 130. In some embodiments, the network device 110 may send an indication to the network device 120 to indicate that the terminal device 130 would like to be served with reference signal densification (for example, by informing the second periodicity or using other message). The network device 120 may decide whether or not to provide the fourth reference signal or whether or not to use the second periodicity. In some embodiments, the network device 110 may send the indication of the second periodicity to more than one neighboring network device if necessary.

In response to the indication of the second periodicity, the network device 120 may send (240) the fourth reference signal to the terminal device 130 according to the second. The fourth reference signal may be sent in a similar way as the second reference signal to increase the reference signal densification of the network device 120. For example, both the third and fourth reference signals are sent according to their respective periodicities by using beams. In some cases, a wide beam may be used to transmit the third reference signal so that other terminal device in addition to the terminal device 130 can still receive this signal. One or more narrow beams referred to as third beams) may be used to transmit the fourth reference signal so that the signal is received by only the terminal device(s) which needs this signal such as the terminal device 130.

In some embodiments, to trigger determining the number of the third beams and its third width, the location of the terminal device 130 may be sent by the network device 110 to the network device 120. This location information may be provided together with the indication of the second periodicity. In some embodiments, the terminal device 130 may be in a dual connection with both the network devices 110 and 120. Therefore, the terminal device 130 may directly provide its location related information to the network device 120 via for example L1 measurements, which may improve the signaling efficiency. The location related information may include the geo-location information or other information that can be used by the network device 120 to determine or estimate the location of the terminal device 130.

The terminal device 130 may receive the fourth reference signal according to the second periodicity (or additionally the third reference signal sent according to the first periodicity). In some embodiments, if the network device 110 decides to request the network device 120 to send the fourth reference signal by sending the indication of the second periodicity (and if the network device 120 accepts this request), the network device 110 may send an identifier of the network device 120 (for example, a cell identifier of the cell 104) to the terminal device. The identifier may be sent together with the indication of the second periodicity. The terminal device 130 may receive the fourth reference signal (and the third reference in some examples) from the network device 120 based on the identifier. In these cases, the terminal device 130 may only receive from the neighboring network device(s) additional fourth reference signal(s) that is determined to be used for further processing or measurement, which may save the power consumption.

Figure 4:
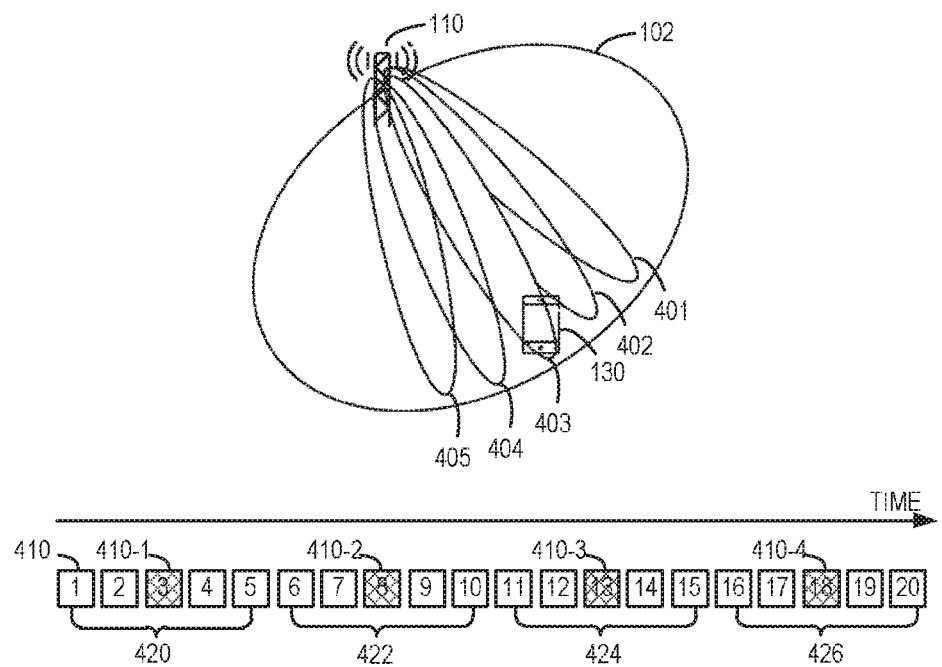
FIG. 4 illustrates measurements of a reference signal using beams according to some embodiments of the present disclosure.

Dependent on the transmission of the reference signals from the network device 110 (or 120), the terminal device 130 may accordingly receive the reference signals. FIG. 4 shows transmission of a reference signal using narrow beams. In this example, the second reference from the network device 110 is transmitted using a narrow second beam. The terminal device 130 may receive five samples 410 of the second reference signal that are sent using the five respective second beams. The network device 110 may sweep the beam in different directions continuously in time domain according to the second periodicity, for example, beams 401 to 405. Since the location of the terminal device 130 is matched with the beam 403, the sample of the second reference signal transmitted using this beam 403 (for example, the samples 410-1, 410-2, 410-3, or 410-4) may be received as having the best channel quality and thus the highest signal strength.

Figure 5:
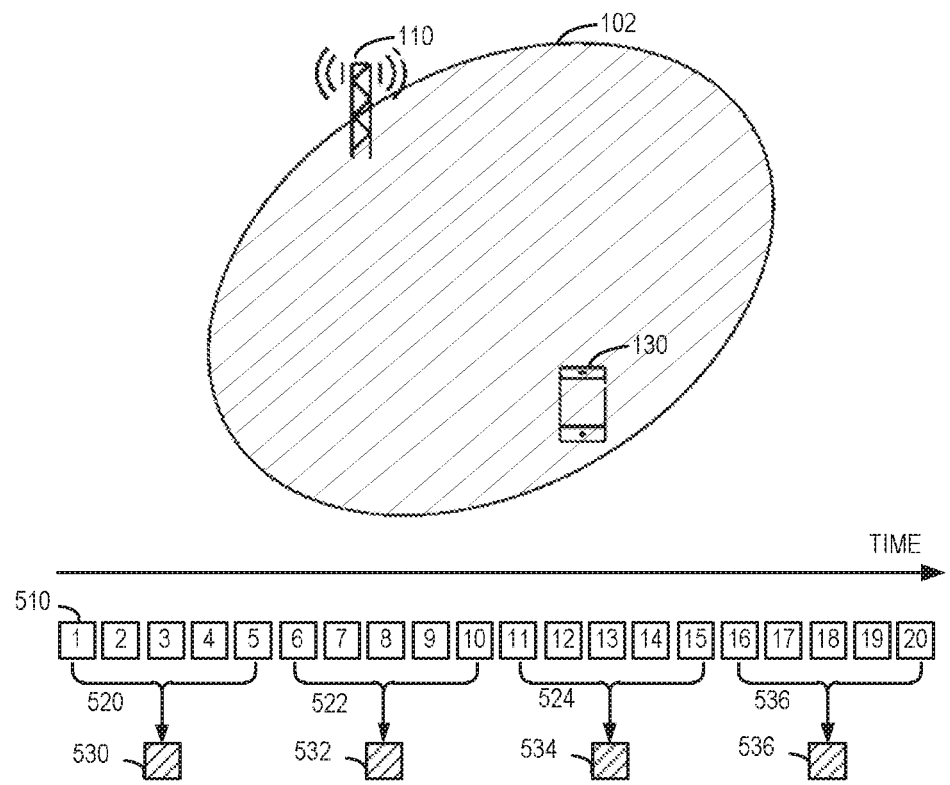
FIG. 5 illustrates measurements of a reference signal using beams according to some other embodiments of the present disclosure.

FIG. 5 shows transmission of the first reference signal using a wide beam. In this scenario, due to the use of the wide beam, all terminal devices in the cell 102 are able to receive the first reference signal, including the terminal device 130. Therefore, according to the first periodicity, the terminal device 130 may receive one or more samples 510 of the first reference signal at different time points and the signal strength of those samples may not be varied in a large range.

Again returning to FIG. 2, the terminal device 130 may generate (250) a further report based on the received reference signal(s). This report may be determined based on measurements of the received signal(s). In some embodiments, the terminal device 130 may determine the further report based on the reception of the second reference only no matter if the first reference signal is received. In some other embodiments where both the first and second reference signals are received by the terminal device 130, the further report may be obtained based on both the signals.

Still referring to FIGS. 4 and 5 as examples. In FIG. 4, it is supposed that at current time point, the terminal device 130 receives 20 samples 410 of the second reference signal as shown in FIG. 4 (i.e. four samples 410 from each of the five beams 401-405) and calculates their corresponding measurements. As a traditional option, the terminal device 130 may determine an average measurement based on measurements of a number of recent samples, for example, the group 426 of samples. However, this may result in a moving average since in duration of the beam sweep, only one or some of the samples have high signal strength.

In some other embodiments, it is desired to generate the further report from the beams with better channel qualities (and thus higher signal strengths). The terminal device 130 may determine whether a signal strength of a received sample of the second reference signal is high (for example, higher than a threshold) among a predetermined range (for example, from 5 samples obtained from a beam sweep. In some examples, one or some samples with the highest or relatively high signal strength may be selected for use. In one example, a MAX operation is performed to select the sample. As shown in FIG. 4, in the four beam sweeps, the sample 410-1 among the group of samples 420, the sample 410-2 among the group of samples 422, the sample 410-3 among the group of samples 424, and the sample 410-4 among the group of samples 426 may be selected. Other samples may be abandoned.

In some examples, at the current time, the terminal device 130 may determine the further report based on a measurement of the current selected sample (for example, the sample 410-4). In some other examples, a predetermined number of selected samples, for example, the samples 410-1 to 410-4 may be considered. Which aspects of the sample of the second reference are measured may depend on the report to be generated.

Alternatively, an average operation may be performed on the samples received using the same beam. For example, measurements of the first, the sixth, the eleventh, and the sixteenth beams collected by using the beam 401 may be averaged, so as the other samples. Among a plurality of averaged measurements, one or more high measurements (higher than a threshold) may be selected to determine the further report.

In some embodiments, the selection of the samples for use may be based on the report to be produced. For example, if the report is generated to reflect RSRQ (which is calculated as RSRQ=RSRP/RSSI), the value of the RSSI may be obtained by the traditional method, for example, by averaging the considered samples (all the 20 samples). The value of the RSRP may be determined as described above.

For the first reference signal, it is also supposed that at the current time point, 20 samples of the first reference signal are received as shown in FIG. 5. Since the signal strengths of those samples may not be varied in a large range, in some embodiments, the current received sample of the first reference signal (the twentieth one) may be averaged with other previous samples and the averaged measurement may be used to determine the further report (together with the measurement determined from the sample(s) of the second reference signal). In some embodiments, before the average operations, a summation (SUM) operation may be performed to collect the energy. Measurements of a predetermined number of samples may be first summed together. The predetermined number may be equal to the number of beams sweep when receiving the second reference signal.

The summation operation is to make the measurement of the first reference signal comparable with that of the second reference signal because the energies used for a wide beam and for a narrow beam at the network device 110 are different. In the example of FIG. 5, every 5 samples of summed together, and thus measurements 530 to 536 summed. from respective groups of sample 520 to 526 are obtained. In some embodiments, a plurality of the summed measurements some or all of the measurements 530 to 536) are averaged and the final averaged measurement is used to determine the further report.

It would be appreciated that the measurement methods provided above are merely for purpose of illustration. Many other methods, either currently existing or to be developed in the future, may be applied to determine one or more measurements from the received samples of the first and second reference signals. Due to the decreased transmission periodicity, it is possible to archive fast measurements both inter-frequency and intra-frequency cases. It would also be appreciated that for the reference signals received from the neighboring network 120, similar methods may be applied to obtain the measurement(s) by the terminal device 130. These measurements may also be used to determine the further report (i.e. the report generated at 250), Still referring to FIG. 2, the terminal device 130 may send (260) the further report to the network device. Although the transmission of the report is a normal operation for the terminal device 130 in cases of receiving a reference signal, the further report, as the previous report, may trigger the network device 110 to enable or disable the change of the periodicity for the reference signal transmission. Considering that the network device 110 has increased the reference signal measurement by sending the second reference signal, upon reception of the further report, the network device 110 may decide whether to disable that densification (for example, by stopping transmitting the second reference signal).

In some embodiments, the network device 110 may perform the same determination based on the further report to determine for example, whether the terminal device 130 is in a cell-edge area or is to handover. If a negative determination is obtained, then the network device 110 may stop transmitting the second reference signal to the terminal device 130 and return back to the normal reference signal (from the perspective of the terminal device 130). In this case, the network device 110 may continue to sending the second reference signal to other terminal devices as needed by them.

In some embodiments, the network device 110 may disable the reference signal densification when it determines that all the terminal devices that need the second reference signal are not at the cell-edge areas. In some embodiments, if the network device 110 decides not to transmit any second reference signal, it may inform it to the network device 120. Therefore, the network device 110 may transmit (270) an indication to the network device 120 to indicate that the fourth reference signal may not needed to be transmitted. The network device 110 may also transmit (280) an indication to the terminal device 130 to inform this change of periodicity so that the terminal device 130 may not expect to receive the second reference signal after receive this indication.

In some embodiments, some new events may be defined and reported by the terminal device 130 to enable or disable the reference signal densification. Those events may not have been specified in current standards. In some examples, the terminal device 130 may determine, based on the reference signal measurement, whether the channel quality of the neighboring network device 120 is worse than that of the network device 110 and report it to the network device 110. Based on this kind of report, the network device 110 may determine that the reference signal densification is not needed by the terminal device 130 and thus may return back to the normal reference signal transmission.

Some configuration information may be provided by the network device 110 to the terminal device 130 to generate the above report. In some examples, a first threshold for determining whether a first channel quality between the terminal device 130 and the network device 110 is higher than a second channel quality between the terminal device 130 and the network device 120. If the terminal device 130 finds from the reference measurements from both the network 110 and 120 that the second channel quality is lower than the first channel quality plus the first threshold, then the terminal device 130 may send a report to the network device 110. Alternatively, or in addition, the configuration information may include a second threshold for determining whether the second channel quality of the network device 120 is low. If the terminal device 130 determines that the second channel quality is relatively low (lower than the second threshold), then it may report it to the network device 110.

Based on the report generated based on the first or second threshold, the network device 110 may decide that the reference signal densification can be disabled. If no such report is received, the network device 110 may continue transmitting the second reference signal.

In some embodiments, the configuration information may be sent by the network device 110 to the terminal device 130 for example, before the corresponding report is required. In one example, the configuration information may be provided when or before the reference signal densification is enabled.

It can be understood that the reference signal densification provided in the process 200 decreases the reference signal transmission periodicity at the network device side and thus the reference signal measurement periodicity at the terminal device side. Since the decrease of the reference signal transmission may occupy time and bandwidth resources of the network device 110, in some embodiments, the network device 110 may configure that only some of the served terminal devices may be provided with the reference signal densification. Upon reception of the corresponding configuration information, the terminal device 130 may be aware of whether it is capable to be served with the reference signal densification. For example, the network device 110 may determine a traffic type of the terminal device 130 and determine to send configuration information related to the reference signal densification to the terminal device 130 based on the traffic type. The traffic type that can have the benefit of the reference signal densification may be the traffic that requires low latency, such as URLLC or eV2x traffic.

The configuration information may be dedicated to indicate that the terminal device 130 is capable to be served with the reference signal densification. In some other examples, the configuration information may be related to the report, such as the first and second thresholds described above or other parameters that are defined for the terminal device 130 to generate a report. In some embodiments, even if the reference signal densification is not provided for the terminal device 130, it may act as in a normal mode to receive the first reference signal.

It would be appreciated that the process 200 may be continuously performed as long as the terminal device 130 is still in the coverage of the network device 110 so that the reference signal densification may be adaptively enabled or disabled for the terminal device 130 according to the measured report.

Figure 6:
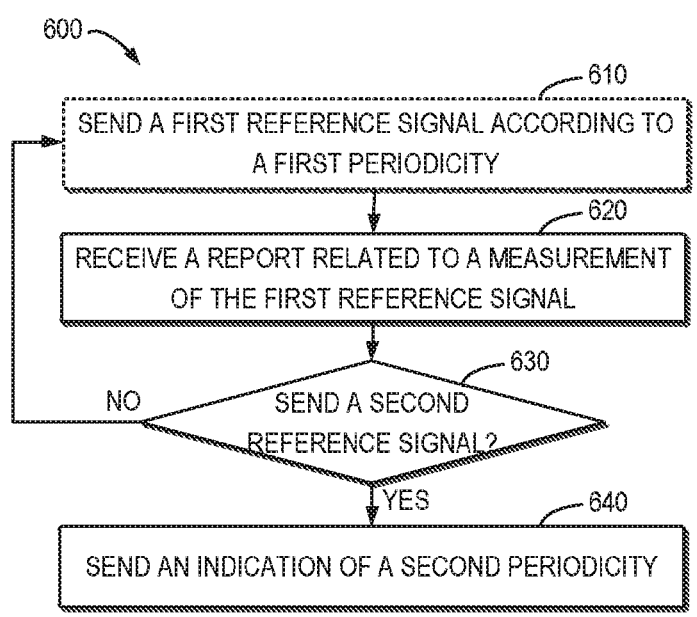
FIG. 6 is a flowchart of a method in accordance with some embodiments of the present disclosure.

FIG. 6 shows a flowchart of an example method 600 in accordance with some embodiments of the present disclosure. The method 600 can be implemented at the network device 110 or 120 as shown in FIG. 1. For the purpose of discussion, the method 600 will be described from the perspective of the network device 110 with reference to FIG. 1.

At block 620, the network device 110 receives from a terminal device 130 a report related to a measurement of a first reference signal. The first reference signal has been sent from the network device to the terminal device according to a first periodicity. Therefore, as shown at block 610, the network device 110 sends the first reference signal to the terminal device 130 according to the first periodicity.

At block 630, the network device 110 determines whether to send a second reference signal to change the periodicity of the reference signal transmission based on the report, if the network device 110 decides to change the periodicity, the network device 110 sends to the terminal device 130 at block 640 an indication of a second periodicity for receiving a second reference signal. The second reference signal is associated with the first reference signal. If the network device 110 decides not the change the periodicity, it may return to the block 610 to continue sending the first reference signal accordingly to the first periodicity.

Figure 7:
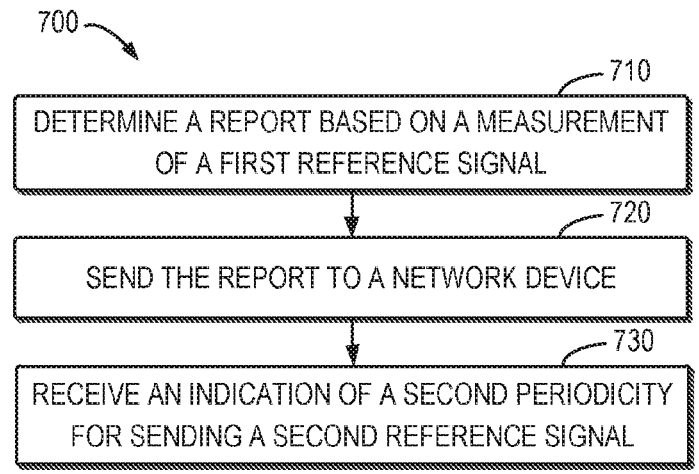
FIG. 7 is a flowchart of a method in accordance with some other embodiments of the present disclosure.

FIG. 7 shows a flowchart of an example method 700 in accordance with some other embodiments of the present disclosure. The method 700 can be implemented at any of the terminal devices 130 as shown in FIG. 1. For the purpose of discussion, the method 700 will be described from the perspective of a terminal device 130 with reference to FIG. 1.

At block 710, the terminal device 130 determines a report based on a measurement of a first reference signal. The first reference signal has been received by the terminal device from a network device 110 according to a first periodicity. At block 720, the terminal device 130 sends the report to the network device 110 to trigger the network device to send a second reference signal. The second reference signal is associated with the first reference signal. At block 730, the terminal device 130 receives from the network device 110 an indication of a second periodicity for receiving the second reference signal.

It is to be understood that all operations and features related to the network device 110 or 120 or the terminal device 130 described above with reference to FIG. 2 are likewise applicable to the methods 600 and 700 and have similar effects. For the purpose of simplification, the details will be omitted.

Figure 8:
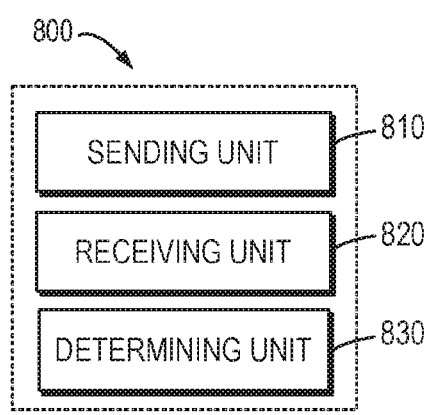
FIG. 8 is a block diagram of a network device in accordance with some embodiments of the present disclosure.

FIG. 8 shows a block diagram of a network device 800 in accordance with some embodiments of the present disclosure. The network device 800 can be considered as an example implementation of the network device 110 or 120 as shown in FIG. 1.

As shown, the network device 800 includes a receiving unit 820 configured to receive from a terminal device a report related to a measurement of a first reference signal, wherein the first reference signal has been sent from the network device to the terminal device according to a first periodicity. The network device 800 also includes a sending unit 810 configured to send, based on the report, to the terminal device an indication of a second periodicity for receiving a second reference signal, wherein the second reference signal is associated with the first reference signal.

In some embodiments, the sending unit 810 may be further configured to, in response to sending the indication of the second periodicity, send the first reference signal to the terminal device according to the first periodicity; and send the second reference signal to the terminal device according to the second periodicity.

In some embodiments, the sending unit 810 may be further configured to: send the first reference signal using a first beam with a first width; and send the second reference signal using one or more second beams with a second width. In some embodiments, the second width is less than the first width.

In some embodiments, the network device 800 may further include a determining unit 830 configured to determine, based on a location of the terminal device, one or more of the second width and the number of the second beams.

In some embodiments, the determining unit 830 may be further configured to determine, based on the report, whether the terminal device is to handover from the network device to a further network device. The sending unit 810 is configured, in response to determining that the terminal device is to handover, to send the indication of the second periodicity.

In some embodiments, the report is further related to a measurement of a third reference signal sent to the terminal device by a further network device according to the first periodicity. The sending unit 810 may be further configured to: send to the further network device an indication of the second periodicity for sending a fourth reference signal, wherein the fourth reference signal is associated with the third reference signal.

In some embodiments, the determining unit 830 may be further configured to determine, based on the report, whether the terminal device is to handover from the network device to the further network device. The sending unit 810 may be further configured to in response to determining the terminal device is to handover, send the indication of the second periodicity to the further network device.

In some embodiments, the sending unit 810 may be further configured to: in response to determining that the terminal device is to handover, send an identifier of the further network device to the terminal device for receiving the fourth reference signal.

In some embodiments, the sending unit 810 may be further configured to: send a location of the terminal device to the further network device to trigger the further network device to determine one or more of the following: a third width for one or more third beams for sending the fourth reference signal, and the number of the third beams.

In some embodiments, the sending unit 810 may be further configured to: send the indication of the second periodicity to a further terminal device.

In some embodiments, the sending unit 820 may be configured to: send the indication of the second periodicity based a RNTI. The RNTI is defined for a group including the terminal device and the further terminal device.

In some embodiments, the sending unit 810 may be further configured to: send to the terminal device configuration information for the report.

In some embodiments, the determining unit 830 may be further configured to determine a traffic type of the terminal device. The sending unit 810 may be further configured to send the configuration information for the report based on the traffic type.

In some embodiments, the configuration information may include one or more of the following: a first threshold for determining whether a first channel quality between the terminal device and the network device is lower than a second channel quality between the terminal device and a further network device; and a second threshold for determining whether the second channel quality is low.

Figure 9:
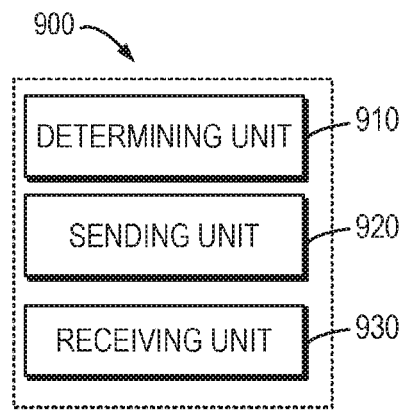
FIG. 9 is a block diagram of a terminal device in accordance with some embodiments of the present disclosure.

FIG. 9 shows a block diagram of a terminal device 900 in accordance with some embodiments of the present disclosure. The terminal device 900 can be considered as an example implementation of the terminal device 130 as shown in FIG. 1.

As shown, the terminal device 900 includes a determining unit 910 configured to determine a report based on a measurement of a first reference signal, wherein the first reference signal has been received by the terminal device from a network device according to a first periodicity. The terminal device 900 also includes a sending unit 920 configured to send the report to the network device to trigger the network device to send a second reference signal, wherein the second reference signal is associated with the first reference signal. The terminal device 900 further includes a receiving unit 930 configured to receive from the network device an indication of the second periodicity for receiving the second reference signal.

In some embodiments, the receiving unit 930 may be further configured to, in response to receiving the indication of the second periodicity, receive from the network device the first reference signal to the terminal device according to the first periodicity; and receive from the network device the second reference signal to the terminal device according to the second periodicity.

In some embodiments, the receiving unit 930 may be further configured to: receive the first reference signal sent by using a first beam with a first width; and receive the second reference signal sent by using one or more second beams with a second width. In some embodiments, the second width is less than the first width.

In some embodiments, the determining unit 910 may be further configured to: determine whether a signal strength of the second reference signal is higher than a predetermined threshold; and in response to determining that the signal strength of the second reference signal is higher than the threshold, determine a further report based on a measurement of the second reference signal.

In some embodiments, the determining unit 910 may be further configured to: determine an average measurement based on a measurement of the first reference signal and a further measurement of a further reference signal received using the first beam; and determine the further report further based on the determined average measurement.

In some embodiments, the determining unit 910 may be configured to: determine the report further based on a measurement of a third reference signal received from a further network device according to the first periodicity, wherein the report indicates whether the terminal device is to handover from the network device to the further network device.

In some embodiments, the receiving unit 930 may be further configured to: in response to the report indicating that the terminal device is to handover, receive an identifier of the further network device from the network device; and receive, based on the received identifier, a fourth reference signal from the further network device according to the second periodicity, wherein the fourth reference signal is associated with the third reference signal.

In some embodiments, the receiving unit 930 may be further configured to: receive the indication of the second periodicity based on a RNTI. The RNTI is defined for a group including the terminal device and a further terminal device.

It should be appreciated that units included in the devices 800 and 900 correspond to the blocks of the process 200 and the methods 600 and 700. Therefore, all operations and features described above with reference to FIGS. 1 to 5 are likewise applicable to the units included in the devices 800 and 900 and have similar effects. For the purpose of simplification, the details will be omitted, The units included in the devices 800 and 900 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the devices 800 and 900 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 10:
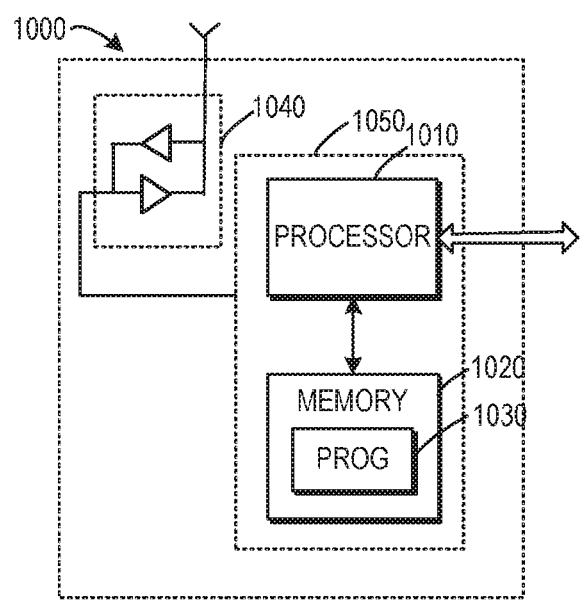
FIG. 10 is a simplified block diagram of a device that is suitable for implementing embodiments of the present disclosure.

FIG. 10 is a simplified block diagram of a device 1000 that is suitable for implementing embodiments of the present disclosure. The device 1000 can be considered as a further example implementation of the network device 110 or the terminal device 130 as shown in FIG. 1. Accordingly, the device 1000 can be implemented at or as at least a part of the network device 110 or the terminal device 130, respectively.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1010 stores at least a part of a program 1030. The TX/RX 1040 is for bidirectional communications. The TX/RX 1040 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1030 is assumed to include program instructions that, when executed by the associated processor 1010, enable the device 1000 to operate in accordance with the embodiments of the present disclosure, as discussed herein with reference to FIGS. 1 to 7. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1010 may form processing means 1050 adapted to implement various embodiments of the present disclosure.

The memory 1010 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1010 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2, 6, and 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multi-tasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

Below is further examples related to the aspects/embodiments as described above.

Some embodiments of the present disclosure discuss RRC measurement configurations for different measurement periods for both intra-frequency and inter-frequency handover. The motivation is that, in order to achieve an ultra-reliable NR connection for high frequencies there should be a possibility in NR to make both the intra and inter frequency measurements faster than in LTE. However, measurements are not for free and consume hardware resources and increase the battery consumption for the UE. Therefore, it should be possible to have several different measurement configurations where only a few UEs need to perform fast measurements while the others can have a slower measurement period. For faster measurements one either has to accept lower accuracy or additional RS overhead by network. Another option is to mandate measurements over a wider bandwidth than normal in order to achieve better accuracy in shorter time. To minimize the UE requirements, the faster measurements may be performed only on a smaller sub-set of the best cells than what is the default.

In one aspect, it is proposed to provide the feasibility to introduce faster handover measurements for both intra and inter frequency handover. In another aspect, it is proposed to provide measurement configurations for different measurement periods for both intra and inter frequency handover.

These aspects allow both faster measurements for some UEs which need to react fast and also slower measurement periods for other UEs which may need to save battery and the like. It is noted that in addition to the measurement period there is also the time-to-trigger timer, for example, the time the UE shall wait until the actual measurement report shall be sent.

What is claimed is:

1. A method implemented in a network device, comprising:
receiving from a terminal device a report related to a measurement of a first reference signal, wherein the first reference signal has been sent from the network device to the terminal device according to a first periodicity; and
sending, based on the report, to the terminal device an indication of a second periodicity for receiving a second reference signal, wherein the second reference signal is associated with the first reference signal.

2. The method of claim 1, further comprising:
in response to sending the indication of the second periodicity,
sending the first reference signal to the terminal device according to the first periodicity; and
sending the second reference signal to the terminal device according to the second periodicity.

3. The method of claim 2, wherein sending the first reference signal comprises:
sending the first reference signal using a first beam with a first width; and
wherein sending the second reference signal comprises:
sending the second reference signal using one or more second beams with a second width.

4. The method of claim 1, wherein sending the indication of the second periodicity comprises:
determining, based on the report, whether the terminal device is to handover from the network device to a further network device; and
in response to determining that the terminal device is to handover, sending the indication of the second periodicity.

5. The method of claim 1, wherein the report is further related to a measurement of a third reference signal sent to the terminal device by a further network device according to the first periodicity, and the method further comprises:
sending to the further network device an indication of the second periodicity for sending a fourth reference signal, wherein the fourth reference signal is associated with the third reference signal.

6. A method implemented in a terminal device, comprising:
determining a report based on a measurement of a first reference signal, wherein the first reference signal has been received by the terminal device from a network device according to a first periodicity;
sending the report to the network device to trigger the network device to send a second reference signal, wherein the second reference signal is associated with the first reference signal; and
receiving from the network device an indication of the second periodicity for receiving the second reference signal.

7. The method of claim 6, further comprising:
in response to receiving the indication of the second periodicity,
receiving from the network device the first reference signal to the terminal device according to the first periodicity; and
receiving from the network device the second reference signal to the terminal device according to the second periodicity.

8. The method of claim 7, wherein receiving the first reference signal comprises:
receiving the first reference signal sent by using a first beam with a first width; and
wherein receiving the second reference signal comprises:
receiving the second reference signal sent by using one or more second beams with a second width.

9. The method of claim 6, wherein determining the report comprises:
determining the report further based on a measurement of a third reference signal received from a further network device according to the first periodicity, wherein the report indicates whether the terminal device is to handover from the network device to the further network device.

10. An apparatus at a network device, comprising:
a processor; and
a memory, the memory containing instructions executable by the processor whereby the apparatus is operative to:
receive from a terminal device a report related to a measurement of a first reference signal, wherein the first reference signal has been sent from the network device to the terminal device according to a first periodicity; and
send, based on the report, to the terminal device an indication of a second periodicity for receiving a second reference signal, wherein the second reference signal is associated with the first reference signal.

11. The apparatus of claim 10, wherein the apparatus is operative to:
in response to sending the indication of the second periodicity,
send the first reference signal to the terminal device according to the first periodicity; and
send the second reference signal to the terminal device according to the second periodicity.

12. The apparatus of claim 11, wherein the apparatus is operative to send the first reference signal by:
sending the first reference signal using a first beam with a first width; and
wherein the apparatus is operative to send the second reference signal by:
sending the second reference signal using one or more second beams with a second width.

13. The apparatus of claim 12, wherein the second width is less than the first width.

14. The apparatus of claim 12, whereby the apparatus is further operative to:
determine, based on a location of the terminal device, one or more of the second width and the number of the one or more second beams.

15. The apparatus of claim 10, wherein the apparatus is operative to send the indication of the second periodicity by:
determining, based on the report, whether the terminal device is to handover from the network device to a further network device; and
in response to determining that the terminal device is to handover, sending the indication of the second periodicity.

16. The apparatus of claim 10, wherein the report is further related to a measurement of a third reference signal sent to the terminal device by a further network device according to the first periodicity, and the apparatus is further operative to:
send to the further network device an indication of the second periodicity for sending a fourth reference signal, wherein the fourth reference signal is associated with the third reference signal.

17. The apparatus of claim 16, wherein the apparatus is operative to send to the further network device the indication of the second periodicity by:
determining, based on the report, whether the terminal device is to handover from the network device to the further network device; and
in response to determining the terminal device is to handover, sending the indication of the second periodicity to the further network device.

18. The apparatus of claim 17, whereby the apparatus is further operative to:
in response to determining that the terminal device is to handover, send an identifier of the further network device to the terminal device for receiving the fourth reference signal.

19. The apparatus of claim 16, whereby the apparatus is further operative to:
send a location of the terminal device to the further network device to trigger the further network device to determine one or more of the following: a third width for one or more third beams for sending the fourth reference signal, and the number of the one or more third beams.

20. The apparatus of claim 10, whereby the apparatus is further operative to:
send the indication of the second periodicity to a further terminal device.

21. The apparatus of claim 20, wherein the apparatus is operative to send the indication of the second periodicity to the further terminal device by:
sending the indication of the second periodicity based on a Radio Network Temporary Identity (RNTI), wherein the RNTI is defined for a group including the terminal device and the further terminal device.

22. The apparatus of claim 10, whereby the apparatus is further operative to:
send to the terminal device configuration information for the report.

23. The apparatus of claim 22, wherein the apparatus is operative to send configuration information for the report by:
determining a traffic type of the terminal device; and
sending the configuration information for the report based on the traffic type.

24. The apparatus of claim 22, wherein the configuration information includes one or more of the following:
a first threshold for determining whether a first channel quality between the terminal device and the network device is lower than a second channel quality between the terminal device and a further network device; and
a second threshold for determining whether the second channel quality is low.

25. An apparatus at a terminal device, comprising:
a processor; and
a memory, the memory containing instructions executable by the processor whereby the apparatus is operative to:
determine a report based on a measurement of a first reference signal, wherein the first reference signal has been received by the terminal device from a network device according to a first periodicity;
send the report to the network device to trigger the network device to send a second reference signal, wherein the second reference signal is associated with the first reference signal; and
receive from the network device an indication of the second periodicity for receiving the second reference signal.

26. The apparatus of claim 25, whereby the apparatus is further operative to:
in response to receiving the indication of the second periodicity,
receive from the network device the first reference signal to the terminal device according to the first periodicity; and receive from the network device the second reference signal to the terminal device according to the second periodicity.

27. The apparatus of claim 26, wherein the apparatus is operative to receive the first reference signal by:
receiving the first reference signal sent by using a first beam with a first width; and
wherein receiving the second reference signal comprises:
receiving the second reference signal sent by using one or more second beams with a second width.

28. The apparatus of claim 27, wherein the second width is less than the first width.

29. The apparatus of claim 26, whereby the apparatus is further operative to:
determine whether a signal strength of the second reference signal is higher than a predetermined threshold; and
in response to determining that the signal strength of the second reference signal is higher than the threshold, determine a further report based on a measurement of the second reference signal.

30. The apparatus of claim 29, wherein the apparatus is operative to determine the further report by:
determining an average measurement based on a measurement of the first reference signal and a further measurement of a further reference signal received using the first beam; and
determining the further report further based on the determined average measurement.

31. The apparatus of claim 25, wherein the apparatus is operative to determine the report by:
determining the report further based on a measurement of a third reference signal received from a further network device according to the first periodicity, wherein the report indicates whether the terminal device is to handover from the network device to the further network device.

32. The apparatus of claim 31, whereby the apparatus is further operative to:
in response to the report indicating that the terminal device is to handover, receive an identifier of the further network device from the network device; and
receive, based on the received identifier, a fourth reference signal from the further network device according to the second periodicity, wherein the fourth reference signal is associated with the third reference signal.

33. The apparatus of claim 25, wherein the apparatus is operative to receive the indication of the second periodicity by:
receiving the indication of the second periodicity based on a Radio Network Temporary Identity (RNTI), wherein the RNTI is defined for a group including the terminal device and a further terminal device.

34. A non-transitory computer readable medium storing a computer program product comprising instructions that, when executed on at least one processor of a network device, cause the at least one processor to:
receive from a terminal device a report related to a measurement of a first reference signal, wherein the first reference signal has been sent from the network device to the terminal device according to a first periodicity; and
send, based on the report, to the terminal device an indication of a second periodicity for receiving a second reference signal, wherein the second reference signal is associated with the first reference signal.

35. A non-transitory computer readable medium storing a computer program product comprising instructions that, when executed on at least one processor of a terminal device, cause the at least one processor to:
determine a report based on a measurement of a first reference signal, wherein the first reference signal has been received by the terminal device from a network device according to a first periodicity;
send the report to the network device to trigger the network device to send a second reference signal, wherein the second reference signal is associated with the first reference signal; and
receive from the network device an indication of the second periodicity for receiving the second reference signal.

* * * * *